United States Patent [19]

DiPiazza et al.

[11] Patent Number: 4,707,689

[45] Date of Patent: Nov. 17, 1987

[54] ADAPTIVE THRESHOLDING SCHEME FOR OPTICALLY-BASED TOUCH SCREENS

[75] Inventors: Philip S. DiPiazza, Morganville; Dale E. Lynn, Freehold; Donald J. Weber, Shrewsbury, all of N.J.

[73] Assignee: AT&T Information Systems Inc. American Telephone & Telegraph Company, Murray Hill, N.J.

[21] Appl. No.: 715,278

[22] Filed: Mar. 25, 1985

[51] Int. Cl.$^4$ .............................................. G09G 1/16
[52] U.S. Cl. ................................. 340/706; 340/712; 178/18; 250/214 B
[58] Field of Search ............ 340/712, 706, 707, 365 P; 178/18; 382/50, 59, 52; 307/358; 250/214 B

[56] References Cited

U.S. PATENT DOCUMENTS

| | | | |
|---|---|---|---|
| 3,701,099 | 10/1972 | Hall et al. | 340/146.3 |
| 3,714,397 | 1/1973 | Macey et al. | 235/61.11 |
| 3,747,066 | 7/1973 | Vernot et al. | 340/146.3 |
| 3,778,768 | 12/1973 | Brisk et al. | 340/146.3 |
| 3,930,248 | 12/1975 | Keller | 340/680 |
| 3,944,977 | 3/1976 | Holmes et al. | 340/146.3 |
| 4,099,075 | 7/1978 | Goldberg et al. | 307/352 |
| 4,243,879 | 1/1981 | Carroll et al. | 250/214 B |
| 4,291,303 | 9/1981 | Catler et al. | 340/712 |
| 4,305,071 | 12/1981 | Bell et al. | 340/712 |
| 4,380,737 | 4/1983 | Sanders | 330/134 |
| 4,484,179 | 11/1984 | Kasaday | 340/712 |
| 4,542,375 | 9/1985 | Alles et al. | 340/712 |
| 4,554,593 | 11/1985 | Fox et al. | 382/50 |

Primary Examiner—Marshall M. Curtis
Assistant Examiner—Mahmoud Fatahi-Yar
Attorney, Agent, or Firm—Frederick B. Luludis

[57] ABSTRACT

The sensitivity of an optically-based touch screen is substantially improved by adaptively establishing the detection threshold based on the peak trapped light measured over a number of frames on the screen being painted. In accordance with one feature of the invention, the peak trapped light from a target area painted on the screen is compared with a priorly established threshold as a way of determining that a target area is being touched by the user. In accordance with another feature of the invention, the threshold is modified in a way that compensates for possible erroneous touch indications due, for example, to bright spots on the screen.

11 Claims, 5 Drawing Figures

4a. BRIGHT SPOT WITH NO TOUCH

4b. CLAMPED TARGET SIGNAL

FIG. 5   TRAPPED LIGHT TARGET SIGNALS
ROW 2

ADAPTIVE THRESHOLDING SCHEME FOR OPTICALLY-BASED TOUCH SCREENS

TECHNICAL FIELD

This invention is directed to an adaptive signal threshold arrangement for optically-based touch-sensitive screens.

BACKGROUND OF THE INVENTION

In U.S. Pat. No. 4,484,179 issued to L. R. Kasday, there is disclosed, inter alia, an optically-based touch-sensitive screen for determining the position of a finger touch on the surface of a CRT screen. This arrangement includes a transparent parallel surface device for overlaying the CRT screen and through which light from the CRT may pass. When a point on the device is touched, light from the CRT raster beam becomes trapped within the device by total internal reflection. This trapped light travels to the edge of the device and is detected by photodetectors mounted along the edge of the device. Since the total internal reflection occurs at the time the CRT raster beam passes under the finger, the raster beam timing can be used to determine the position of the touch.

Disadvantageously, imperfections in the material used in the optically-based touch screen, as well as dust, fingerprints, smudges, etc., on the touch screen itself, all good combine to cause some total internal reflection of the CRT raster beam when the screen is not touched. Consequently, a problem arises of distinguishing trapped light signals that occur when a displayed image is touched from trapped light signals that occur when the image is not touched.

This problem is compounded if an image is displayed at a bright spot on the CRT, since the luminance of the bright spot causes the level of trapped light to increase. This increase can thus lead to a false indication that a displayed image has been touched when in fact it has not been touched by the user.

One possible approach to the problem of determining when a screen is touched would be to use some form of adaptive thresholding to detect a sought-after signal. In such an arrangement, a voltage threshold would be adapted to the level of the background, or non-sought-after, signals "on the fly" and the level of a received signal would be compared with the level of the threshold. Only if the received signal exceeds the adaptive threshold would it be identified as being the sought-after signal. Typical optically-based touch screen arrangements display particular regions on the screen, referred to as "targets", for touch by the user and a trapped light signal that comes from a target that is touched needs to be distinguished from one that comes from a target that is not touched. In such arrangements, adapting the aforementioned threshold "on the fly" as previously described may give rise to a number of problems.

For example, a target might be displayed at a so-called CRT bright spot, possibly resulting in an untouched target signal level that exceeds the threshold and therefore resulting in an erroneous indication that the target had been touched.

A problem may also arise in the above-described scheme when a new ensemble of displayed targets is displayed. The threshold value that obtains immediately upon the target change will, for some time, be based, at least in part, on the old targets until the threshold has had a chance to adapt to the level of the signals from the new untouched targets. The intensities of the new untouched targets may, however, be different from those of the old because the luminance of the CRT phosphor may vary from one location of the CRT screen to another. Again, the level of an untouched target signal could exceed the threshold and be misinterpreted as coming from a touched target.

SUMMARY OF THE INVENTION

In accordance with the invention, a threshold for use in an optically-based touch screen arrangement is established based on the level of signals received from the touch screen during a first period of time, and that threshold is used during a subsequent period of time to determine when the screen is touched. In preferred embodiments of the invention, both the signals which are used to establish the threshold as well as the signals which are compared to the threshold are modified to account, for example, for CRT bright areas and for varying levels of trapped light signals received from different regions of the display.

BRIEF DESCRIPTION OF THE DRAWINGS

FIG. 5 illustrates a series of target signals which result from a series of targets displayed on line 2 of the CRT screen.

GENERAL DESCRIPTION

Figure 1:
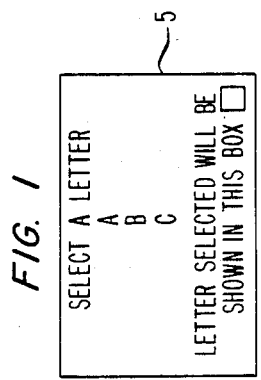
FIG. 1 is a broad block diagram of an optically-based touch screen.

In a raster-scanned CRT, the raster beam of electrons from the CRT electron gun impinge on the phosphorescent screen of the CRT in a sequential pattern, line by line, from top to bottom. As the electrons hit the phosphorescent screen of the CRT, the surface glows.

By controlling the deflection of the raster beam, using for example, a CRT controller, it is possible to create images representative of numbers, letters or signals in any position on the CRT screen. In an optically-based touch-sensitive screen of the type disclosed in the above-mentioned Kasday patent in which the touch screen overlays the face of the CRT screen, the CRT controller is arranged to display on the CRT screen an image, or target, calling for user response. The target may be touched by the user's finger or some other device held by the user. If the user touches the displayed target, the touch deflects the touch-sensitive screen, thereby causing light signals from the displayed target to become trapped within the touch screen by total internal reflection. This trapped light travels to the edges of the screen where it is detected by photodetectors, or photodiodes, which provide an output signal that is usable for determining that the displayed target has been touched. Total internal reflection of CRT light signals also occurs, however, when the touch screen is not touched. The photodiodes thus output signals that may come either from a touched target, from an untouched target or from other displayed images (nontargets). As will be pointed out below, the photodiode signals which come from nontargets are selectively blocked by a gate circuit, since there is no need to deal with these signals.

Hereinafter, the term "target signal" is used to refer to a signal that is formed from signals outputted by photodiodes in response to light signals received by the photodiodes from a displayed target. This term will be qualified by either the word "touched" or the word "untouched" to differentiate between signals from a touched target and signals from an untouched target, respectively.

The level of a touched target signal typically exceeds the level of an untouched target signal, and this fact could be relied upon to generate a threshold "on the fly" and to use that threshold to distinguish touched and untouched target signals. While this might work with CRT terminals which have tight control over the intensity of the CRT raster beam, it does not appear that it would work with CRT terminals which, for example, allow the user to control the intensity of the raster beam or which may easily develop a bright spot. The reason for this is that in thresholding schemes, a signal is identified as being the sought-after target signal if its level exceeds the threshold. Otherwise, it is identified as being the background signal from which the threshold would be generated. However, in the case where the level of a nontarget signal is boosted by, for example, some anomaly, such as a CRT bright spot, it could exceed the threshold if the threshold is one that adapts "on the fly" and the signal could be incorrectly identified as being the sought-after signal.

To illustrate the foregoing, there is shown in FIG. 1 in block diagram form optically-based touch screen 5 of the type disclosed in the above-mentioned Kasday patent in which targets A, B and C are displayed on the CRT (not shown) and are observed through the touch screen. It is assumed that target C is displayed at a CRT bright spot, and its luminance is more intense than that of either target A or target B. If the above-described prior art thresholding scheme were used, the threshold would adapt to the target signals coming from targets A and B before the raster beam displayed target C. When target C is displayed, the level of the target signal resulting therefrom will exceed the level of the established threshold and the signal would be misidentified as being a touched target signal, when in fact it isn't.

Moreover, because prior thresholding schemes adapt "on the fly", they adapt to the level of signals that are produced when the touch screen is slowly deflected by the user. This occurs because in thresholding schemes the level of a signal typically needs to exceed the established threshold by a predetermined margin before it is identified as being a target signal. In the instance where the touch screen is being slowly deflected, the level of the resulting target signal increases slightly with each slight increase in the deflection of the screen and the touched target signal never sufficiently exceeds the threshold to be identified as a touched target.

In accordance with the invention, we have dealt with these and other problems by adapting the threshold based on target signals that occur over a plurality of CRT frames, illustratively 4 frames, before the threshold is actually used to distinguish between touched and untouched target signals and before the user has an opportunity to touch a target.

Figure 2:
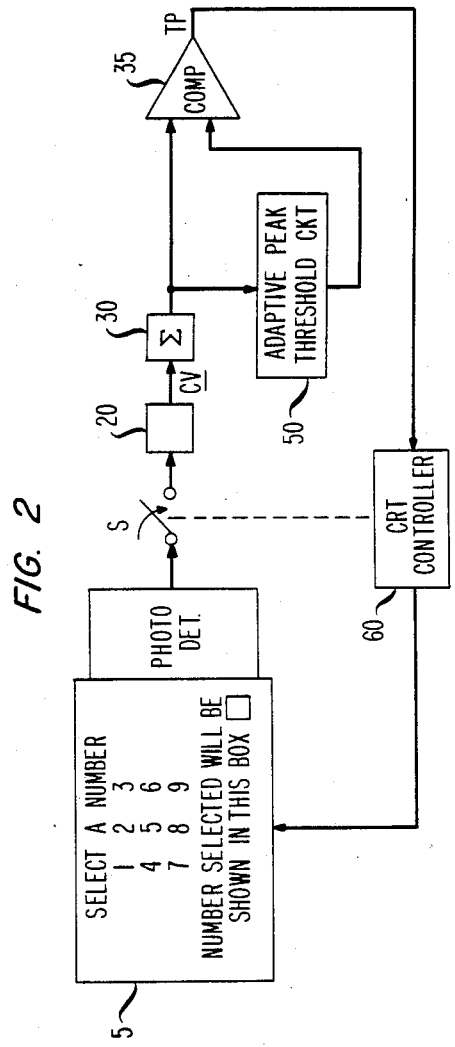
FIG. 2 is a block diagram of an optically-based touch-sensitive screen in which the invention may be practiced.

A functional block diagram of an arrangement embodying our invention is shown in FIG. 2 in which CRT controller 60 is arranged to display different patterns of target signals on a CRT screen (not shown) and is also arranged to track the location of a target as it is displayed on the CRT, as is done in light pen arrangements. It is further arranged to generate a signal each time a target is displayed on the CRT screen.

The signal formed from the photodiode signals is processed through clamp circuit 20 and summing amplifier 30, of which more hereinbelow, and the resulting target signal is supplied both to comparing circuit 35 and to adaptive peak threshold circuit 50. The threshold contained in the latter circuit is arranged to adapt to the peak level of target signals that occur over 4 CRT frames. At the end of the 4th frame, the threshold is transferred to the output of circuit 50. Threshold circuit 50 is then restarted to form the next threshold over the next adjacent group of 4 frames. During the next adjacent group of 4 frames, comparing circuit compares the level of the priorly established threshold to the level of each target signal it receives. If the level of a target signal exceeds the threshold, comparing circuit notifies controller 60 of this fact via lead TP.

One aspect of signal detection that is not dealt with by prior thresholding schemes is the case in which an untouched target signal is superimposed on a nontarget signal, such as a signal coming from, for example, fluorescent lighting or a CRT bright area, such as a bright area containing inverse video. In this case, the level of the untouched target signal is boosted by the level of the nontarget signal. If a prior art thresholding scheme is used, the level of the untouched boosted target signal could exceed the threshold and therefore be misidentified as a touched target signal. In accordance with a feature of the invention, we deal with this problem by subtracting the level of the nontarget signal from the level of the untouched boosted target signal, thereby restoring the untouched target signal to its unboosted level. Moreover, we deal with the problem of detecting weak target signals, i.e., those signals which result from trapped light that enters screen 5 at a point that is at the fringe of the optical detection range of the photodiodes. In particular, in accordance with a feature of the invention, the level of each target signal is adjusted by summing amplifier 30 using a predetermined contour voltage (CV) that is specially established for the CRT character location at which the respective target is displayed, before the target signal is supplied to comparing circuit 35 and to threshold circuit 50.

Another aspect of signal detection that is not dealt with by prior art thresholding schemes is the case in which the pattern, or ensemble, of displayed targets changes, for example, as a result of a new screen being displayed when the user selects a "menu" item by touching one of the displayed targets. If a prior art thresholding scheme were employed, an untouched target signal from a new display of targets could be misinterpreted as being a touched target signal, since the level of the untouched target signal would be compared with a threshold that is based on a prior pattern and number of displayed targets. We deal with this problem in our arrangement by, in accordance with a feature of the invention, tracking the number of targets that are displayed during each CRT frame and by comparing the number of targets displayed during one frame with the number of targets displayed during the next adjacent frame. If the two numbers agree, we assume that the pattern of displayed targets has not changed; if they disagree, however, we assume that the pattern has changed. When a change is detected, the threshold outputted by threshold circuit 50 is forced to a predetermined high level to prevent comparing circuit 35 from misinterpreting the level of target signals from the new display. This higher threshold is outputted by threshold circuit 50 for 4 frames, during which time, a new threshold is established, one which adapts to the level of target signals from the new display of targets. At the end of the 4th frame, the higher threshold is removed and the newly established threshold is transferred to the output of threshold circuit 50.

DETAILED DESCRIPTION

Figure 3:
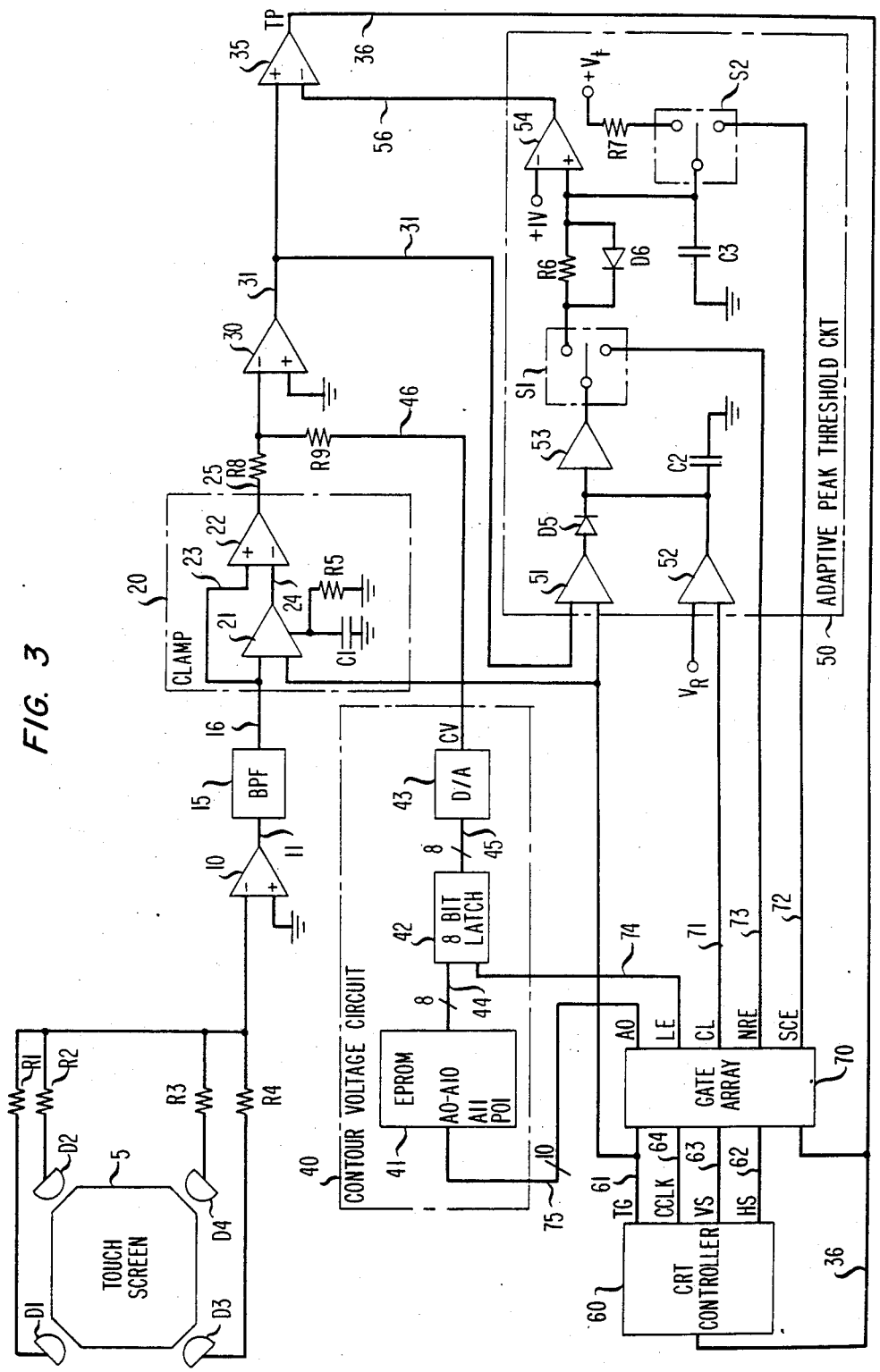
FIG. 3 is a block diagram of the adaptive thresholding scheme used in the system of FIG. 2 embodying the principles of our invention.

FIG. 3 is a more detailed depiction of the embodiment of FIG. 2. As in the latter FIG., the arrangement includes clamp circuit 20, summing circuit 30, comparing circuit 35, threshold circuit 50 and CRT controller 60. The arrangement of FIG. 3 also includes other elements which will be discussed hereinafter.

Specifically, photodiodes, or photodetectors, D1 through D4, for example, diodes LF357 available from National Semiconductor Corporation, are mounted at respective corners of optically-based touch screen 5. Each photodiode outputs a signal that is indicative of the level of light that impinges on it. The signals outputted by photodiodes D1 through D4 are supplied to the inverting input of summing amplifier 10 via resistors R1 through R4, respectively. Amplifier 10 sums the photodiode signals and passes the resulting summed signal to band pass filter 15 via lead 11.

To properly filter video signals, such as the signal formed from the photodiode signals, band pass filter 15 is arranged as a two-pole approximation of a linear phase low pass filter that is preceded by a single-pole high pass filter. This arrangement establishes a pass band of 80 kHz through 300 kHz, which passes video signals but rejects other signals that are out of the pass band. The 3 db highpass rolloff of filter 15 is not particularly sharp; therefore, noise signals, such as 50 or 60 Hz noise signals from fluorescent or incandescent lighting, may pass through filter 15. These signals are dealt with, however, by clamp 20, as will be explained below. Band pass filter 15 and summing amplifier 10 can each be realized using, for example, amplifier LF357 available from National Semiconductor Corporation.

Synchronous clamp, or dc restorer, 20 comprising sample and hold amplifier 21, for example, amplifier SMP11 available from Precision Monolithics, Inc., and differential amplifier 22, for example, amplifier TL072 available from Texas Instruments Inc., is arranged to clamp, or restore, a target signal supplied by filter 15 via lead 16 to a predetermined level when the target signal is superimposed on a nontarget signal. Sample and hold amplifier 21 samples the level of nontarget signals that appear on lead 16 and stores the level across capacitor $C_1$. The signal level stored on capacitor $C_1$ is gated to the inverting input of amplifier 22 via amplifier 21 and lead 24 whenever lead TG is pulsed by video controller 60. Controller 60 pulses lead TG each time it displays a target on the CRT screen, thereby effecting the function performed by switch S shown in FIG. 2. In this way, as will be explained below in detail in connection with FIGS. 4a and 4b, a noise signal from room lighting or a signal from inverse video appearing on lead 16 coincident with a target signal is cancelled, since a replica of the noise signal as provided by capacitor $C_1$ and the noise signal are supplied at the same time to the inverting and noninverting input of differential amplifier 22, respectively.

Summing amplifier 30, for example, amplifier TL072 available from Texas Instruments Inc., operating in conjunction with contour voltage circuit 40 adjusts the level of each target signal that it receives by a predetermined value, as will be explained below in detail in connection with FIG. 5. Presently, it suffices to say that a predetermined contour voltage level is priorly established for each character location on the CRT and that the level of each target signal that is supplied to amplifier 30 via lead 25 and resistor R8 is adjusted by the level of the respective contour voltage that is supplied by contour voltage circuit 40 via lead 46 and resistor R9. The target signal outputted by summing amplifier 30 is then supplied via lead 31 to the input of comparing amplifier 35 and to adaptive peak threshold circuit 50.

We have found that user response to a new pattern of displayed targets is typically no less than 0.6 seconds. We take advantage of this fact and establish a threshold, in accordance with the invention, over 4 video frames, which occur in approximately 0.1 seconds. This time is more than sufficient to allow the voltage threshold to adapt to target signals whose level may be increased because they are displayed at video bright spots or because the intensity of the raster beam has changed, as mentioned above.

Amplifier 51 of threshold circuit 50 is arranged as a gate circuit and when it is enabled by controller 60 via lead TG, it gates the target signal that appears on lead 31 to capacitor C2. Capacitor C2 in conjunction with blocking diode D5 charges, or adapts, to the level of the target signal only if the signal exceeds the level of the voltage that is already established across capacitor C2. Diode D5 is reverse biased whenever the voltage level across capacitor C2 exceeds the level of the target signal, thereby preventing capacitor C2 from discharging through amplifier 51 when the peak level of the target signal that is outputted by amplifier 51 is lower than the level of the threshold voltage that is being established. Thus, the voltage across capacitor C2 is representative of the maximum target signal output by amplifier 30 since capacitor C2 was last discharged, as described below.

At the end of each group of 4 frames, functionally shown switch S1 is operated by gate array 70 via lead NRE. This transfers the threshold voltage on capacitor C2 to a capacitor C3 via amplifier 53 and resistor R6. Gate array 70 then enables amplifier 52 via lead CL which allows capacitor C2 to discharge to the level of reference voltage $V_R$ in order to establish a minimum reference voltage across capacitor C2. Amplifiers 35, 51, 52 and 53 can be, typically, amplifier PKD01 available from Precision Monolithics, Inc.

We have observed that the level of a touched target signal exceeds the level of an untouched target signal by several or more volts. We have also observed that the luminance of a displayed target may increase momentarily due to random noise. Consequently, since the level of an untouched target signal is a function of random noise in the system, it may be mistakenly interpreted as being a signal from a touched target. To avoid this condition, amplifier 54, for example, amplifier TL072 available from Texas Instruments Inc., is arranged as a summing amplifier which raises the threshold voltage by illustratively +1 volt before the threshold voltage is supplied to the inverting input of comparing circuit 35 via lead 56. This is done by connecting +1 volt and the voltage threshold that is across capacitor C3 to the inverting and noninverting inputs of amplifier 54, respectively.

It is thus seen that a threshold voltage is established by allowing it to adapt to the peak level of target signals from a particular pattern of displayed targets. This adaptation of a voltage threshold accounts for CRT bright spots, random noise in the system and for changes in the illuminance of the CRT phosphor due to, for example, aging of the phosphor or user brightness adjustments.

Continuing with FIG. 3, comparing amplifier 35 is arranged as a difference amplifier and applies a pulse TP to lead 36 when the level of a target signal that is supplied to its noninverting input exceeds the level of the voltage threshold that is supplied to its inverting input. Otherwise, the signal level on lead 36 remains at ground level. The pulse on lead 36 sets a register contained within controller 60, which is interpreted by controller 60 as an indication that the target currently being displayed has been touched by the user.

Gate array 70 is a sequential circuit comprising digital counters and combinational logic circuits for supplying control signals to adaptive peak threshold circuit 50 and for supplying a CRT character address to EProm 41 of contour voltage circuit 40.

A standard CRT monitor displays 27 lines of 80 characters each over a single video frame. To coordinate gate array 70 with the position of a displayed character, CRT controller 60 supplies a horizontal sync (HS) signal and a character clock signal (CCLK) to gate array 70, via leads 62 and 64, respectively. Gate array 70 counts each horizontal sync signal, or pulse, and counts each character clock signal to form an address which corresponds to the CRT character location that is being displayed. As each address is formed by gate array 70, it is passed to the 10-bit address input (A0–A10) of EProm 41 via bus 75. EProm 41, for example, EProm TMS2532 available from Signetics Inc., has 2,029 memory locations of 8 bits each of which 1,470 are used for the storage of an 8-bit digitized predetermined contour voltage for each CRT character location. When it receives a 10-bit address, EProm 41 addresses the memory location that is identified by the 10-bit address and outputs the digitized contour voltage level which is stored at that memory location to 8-bit bus 44. Gate array 70 then supplies a latch enable to latch 42 which latches the 8-bit digitized contour voltage that appears on bus 44 into an 8-bit register. The digitized contour voltage is then passed to digital-to-analog converter 43, for example, D/A converter DAC0806 available from National Semiconductor Corporation. Converter 43 converts the digitized contour voltage into an analog signal and supplies that signal to summing amplifier 30 via lead 46 and resistor R9, as mentioned above.

At the end of each video frame, CRT controller 60 supplies a vertical sync pulse to array 70 via lead 63, which increments an array 70 frame counter and which clears the EProm 41 address counter contained within array 70. When the contents of the frame counter equals a count of 4, array 70, as mentioned above, enables the new reference lead 73 (NRE) to operate switch S1. Array 70 also clears the frame counter in preparation for counting the next group of 4 frames.

Array 70 is also arranged to detect a change in the number of displayed targets, as mentioned above. It does this by counting each pulse that appears on lead 61 (TG) during each video frame and by comparing the number of TG pulses counted for one frame with the number of pulses counted for the next adjacent frame. If the respective target counts obtained for two adjacent frames agree, then array 70 assumes that the number of displayed targets has not changed. If the two target counts disagree, however, then it assumes that the number of displayed targets from one frame to the next adjacent frame has changed. In the latter instance, in accordance with a feature of the invention, gate array 70 operates switch S2, which causes capacitor C3 to charge toward a higher reference voltage $V_t$ through resistor R7. The level of voltage $V_t$ is selected to be substantially higher than the level of a touched target signal, thereby preventing comparing amplifier 35 from detecting those signals. Switch S2 remains operated for one millisecond to raise the threshold voltage and allow the voltage across capacitor C2 to adapt to the peak level of the signals provided by the new pattern of displayed targets. At the end of 4 frames, array 70 operates switch S1, thereby allowing capacitor C3 to discharge through diode D6 to the level of the threshold voltage that now appears across capacitor C2.

It is noted that when a touched target signal appears on lead 31 the threshold adapts to the level of that signal, thereby raising the threshold to the level of the touched target signal. Gate array 70 is also arranged to receive the TP pulse from comparing amplifier 35 via lead 36. When it receives this pulse, gate array 70 prevents the threshold that is being established across capacitor C2 from being transferred to capacitor C3 at the end of the 4th frame. It does this by clearing its frame counter and by discharging capacitor C2 to voltage VR, as mentioned above.

Synchronous Clamp

Figure 4:
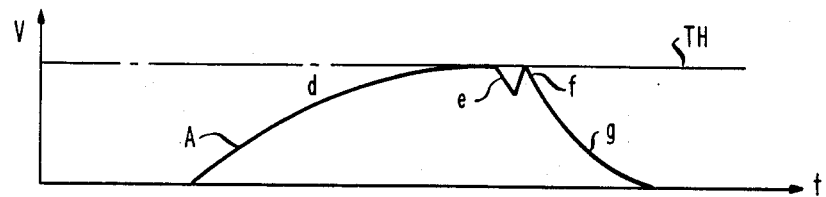
FIG. 4a illustrates the waveform which results from a displayed bright area on which a target signal is superimposed.
FIG. 4b illustrates the target signal of FIG. 4a restored to a predetermined voltage level.
Figure 4:
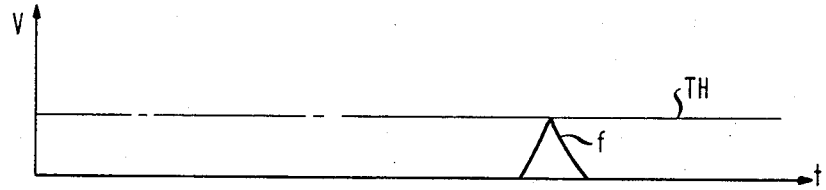
Figure 4:
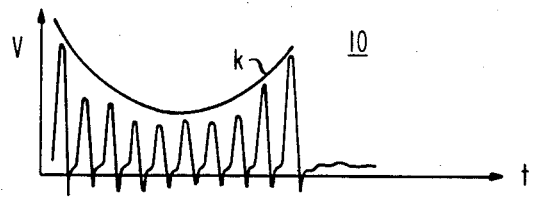

As mentioned above, a problem arises when a target signal is superimposed on another signal, i.e., the target signal and the other signal appear on lead 16 at the same time. This problem is especially acute if the other signal happens to be a signal which originates from a bright area that is displayed adjacent to a displayed target. For example, FIG. 4a illustrates signal A which is outputted by amplifier 10 when a bright area is displayed adjacent to a target. It is seen from FIG. 4a that the level of signal A increases exponentially, as illustrated by segment d. This is due to the fact that the level of trapped light is low when the bright area is first being painted on the CRT screen. The level of trapped light and hence the level of signal A reaches a maximum when the bright area is completely displayed. When the raster beam moves to the next display location, the signal from the bright area starts to decay exponentially due to the exponential decay in the luminance of the phosphor at the bright area, as illustrated by segments e and g of signal, or waveform, A.

Superimposed on waveform A is the signal from the adjacent untouched displayed target, as illustrated by segment f. It is seen from FIG. 4a that the effects of the bright area "spills over" into the character location of the displayed target. If the signal level of segment f is allowed to pass to threshold circuit 50, capacitor C2 would adapt to it and raise the threshold to the level of waveform A illustrated by the level of line TH. Consequently, the threshold would be inordinately high and the arrangement would fail to detect a lower level signal from another displayed target that is touched by the user.

In accordance with a feature of the invention, synchronous clamp 20 is arranged to follow the level of signals, such as noise signals or signals from a bright area, and to effectively cancel it by clamping the adjacent target signal to illustratively 0 volts. Clamp 20 does this by continuously sampling the level of signals on lead 16 and storing the sampled level on capacitor C1.

The RC charging time constant of capacitor C1 through sample-hold amplifier 21 is sufficiently fast to store samples of signals that have a lower frequency than video signals. However, the normal discharge path for capacitor C1 is a high-impedance path through amplifier 22; accordingly, capacitor C1 cannot discharge fast enough to be in step with a decreasing signal, such as the exponentially decaying portion of waveform A (segments e and g). We deal with this problem by adding resistor R5 to clamp circuit 20 to provide a discharge path so that capacitor C1 can discharge at a rate which approximates the rate of decay of the signal resulting from the luminance of the bright area.

To cancel signals from bright areas, or other similar type signals, the voltage across capacitor C1 is gated to differential amplifier 22 via amplifier 21 whenever a target is displayed on the CRT, as mentioned above. Because the voltage across capacitor C1 tracks the level of the signal resulting from the bright area, the effect of that signal on a target signal is cancelled at amplifier 22. This is done, as mentioned above, by supplying the signal and a replica of that signal from capacitor C1 to the inverting input and noninverting input of differential amplifier 22, respectively. The target signal is outputted as the difference signal, as illustrated in FIG. 4b, since it is the difference between the two signals that are supplied to differential amplifier 22. In the case where the target is touched, the difference signal would be the touched target signal.

Contour Voltage

The level of a target signal originating from trapped light signals emitted by a displayed target is proportional to the number and spacing of the photodiodes that are placed along the side edges of touch screen 5. It can be appreciated that when photodiodes are positioned in close proximity to a CRT screen, they need to be shielded from electrostatic voltage discharge from high voltages that are found in CRT circuits. Also, since a photodiode is a high-impedance device, it needs to be buffered with an amplifier (not shown in the drawing) to the lead that connects it to its respective resistor, such as leads 1 through 4, to reduce the level of RF noise that may be picked up by the lead. However, such photodiode arrangements are expensive and substantially increase the cost of a touch screen circuit.

We have found that the cost of providing an optically-based touch screen can be reduced by using illustratively only four photodiode arrangements, one placed at each corner of screen 5 and, in accordance with a feature of the invention, adding a predetermined voltage level, or contour voltage, to each target signal to offset the reduction in the level of target signal that occurs from using only four photodiode arrangements. The cost of providing the contour voltages is comparable to the cost of a diode arrangement and provides the added advantage of increasing the sensitivity of the circuit shown in FIG. 3 to detect touched target signals.

Referring now to FIG. 5, there is shown a series of ten target signals which are the result of ten equally-spaced targets that are displayed on row, or line, 2 of the CRT screen. It is seen from FIG. 5 that the level of each signal as it is outputted by summing amplifier 10 increases to the left and to the right of the center signals. This variation in signal level occurs because the leftmost and right-most displayed targets are closest to photodiodes D1 and D2, respectively, while the targets displayed at the center of the screen are the furthest from these diodes and are at the fringe of the optical receiving range, or pattern, of diodes D1 and D2. Consequently, trapped light signals occurring at the fringe of the optical receiving range of the photodiodes are not as readily detected as those that are within range of the photodiodes.

As shown in FIG. 5, line k, which we call a contour line, is an approximation of the contour that is made by the peaks of the illustrated signals. In accordance with a feature of the invention, we use the reciprocal of line k to represent a contour voltage, which is equally divided to provide 80 character contour voltage levels, one for each of the 80 character locations on row 2 of the CRT screen. Each contour voltage level that is obtained from the contour line is represented by 8 bits and is stored in an EProm 41 memory location that is representative of the position of its respective CRT screen character, as mentioned above.

A contour voltage is established for each character position, or location, on the first fourteen lines of the CRT display. This is done in the same manner as was done for row 2, as discussed above, in which a contour line is established for each of the first 14 lines of the display. Since the top half and the bottom half of screen 5 are mirror images of each other, the contour voltages established for the character locations in the top half of the screen can also be used for the bottom half of the screen. A predetermined contour voltage is thus established for each CRT character location, since a target can be displayed at any position on the CRT screen.

CONCLUSION

Although a specific embodiment of our invention is shown and described herein, such merely illustrates the principles of the invention. Those skilled in the art will be able to devise other arrangements which, although not specifically shown or described herein, embody those principles and which do not depart from their spirit and scope. For example, amplifier 30 could be replaced by a multiplier circuit in which the level of the target signal on lead 25 is adjusted using a predetermined multiplier rather than a contour voltage.

What is claimed is:

1. An adaptive thresholding circuit for use with an optically-based touch screen of the type which is overlaid on the face of a display, said display being used to display a plurality of touch targets, said targets being respective sources of signals, said circuit comprising:
    means for receiving signals from said plurality of targets,
    means for establishing a single threshold for said targets based on the levels of said signals as they are received from said plurality of targets over a predetermined period of time, and
    means for comparing said threshold with the level of ones of said signal received from said plurality of targets over a subsequent period of time, and for generating a predetermined signals for each of said ones of said subsequently received signals that exceeds said threshold.

2. The invention set forth in claim 1 wherein said source of signals is an optically-based touch-sensitive screen, where said subsequently received signals which exceed said threshold come from touched targets displayed on a CRT screen, wherein said signals received over said predetermined period of time come from untouched targets displayed on said CRT screen, wherein the level of at least one of said target signals is subject to a change from its initial level as the result of the presence of a nontarget signal in the proximity of said one target, and wherein said means for receiving further includes means for restoring said one target signal to said initial level.

3. The invention set forth in claim 2 wherein said means for receiving further includes means for adjusting the level of individual ones of said signals using a predetermined contour voltage.

4. The invention set forth in claim 3 wherein said predetermined contour voltage is one of a plurality of predetermined contour voltages each being established for a respective character location on said CRT screen.

5. The invention set forth in claim 2 wherein said means for establishing said threshold further includes means for tracking the number of targets displayed on said screen and for replacing said threshold with a threshold of a higher level when the number of targets displayed on said CRT screen changes.

6. An adaptive thresholding circuit for use with an optically-based touch screen of the type which is overlaid on the face of a display, said display being used to display at least one pattern of touch targets, said arrangement comprising means for receiving signals from said plurality of targets, said signals having respective signal levels, means for establishing a common signal level threshold for said plurality of targets based on the levels of said signals as they are received from said plurality of targets over a predetermined period of time, and means responsive to said threshold and to the level of individual ones of said signals subsequently received from said plurality of targets for outputting a predetermined signal whenever one of said ones of said subsequently receive signals exceeds said threshold.

7. The thresholding circuit set forth in claim 6 wherein said source of signals is an optically-based touch-sensitive screen, wherein said subsequently received signals which exceed said threshold come from touched targets displayed on a display, wherein said signals received over said predetermined period of time come from untouched targets displayed on said display, wherein the level of at least one of said target signals is subject to a change from its initial level as the result of the presence of a nontarget signal in the proximity of said one target, and wherein said means for receiving further includes means for restoring said one target signal to said initial level.

8. The thresholding circuit set forth in claim 6 wherein said means for establishing said threshold includes means for adjusting the levels of said received signals using respective predetermined contour voltages.

9. The thresholding circuit set forth in claim 8 wherein each of said predetermined contour voltages is associated with a respective display character location.

10. The thresholding circuit set forth in claim 6 wherein said means for establishing said threshold includes means for tracking the number of targets displayed on said display and for replacing said threshold with a threshold having a predetermined level whenever the number of targets being displayed on said display changes.

11. A method of performing adaptive thresholding of signals received from a plurality of sources of signals, said signals having respective signal levels, said method comprising the steps of establishing a common threshold for said plurality of sources based on the levels of the signals as they are received from said plurality of sources over a predetermined period of time.

comparing said threshold with the level of ones of said signals receive from said plurality of sources over a subsequent period of time, and generating a predetermined signal for each of said ones of said subsequently received signals having a level which exceeds said common threshold.

* * * * *

UNITED STATES PATENT AND TRADEMARK OFFICE
CERTIFICATE OF CORRECTION

PATENT NO. : 4,707,689

DATED : November 17, 1987

INVENTOR(S) : Philip S. DiPiazza, et al

It is certified that error appears in the above-identified patent and that said Letters Patent is hereby corrected as shown below:

Column 10, line 62, "signal" should read --signals--.

Column 10, line 64, "signals" should read --signal--.

Column 11, line 42, "receive" should read --received--.

Column 12, line 38, "receive" should read --received--.

Signed and Sealed this

Seventeenth Day of January, 1989

Attest:

DONALD J. QUIGG

Attesting Officer

Commissioner of Patents and Trademarks